US006256618B1

(12) United States Patent
Spooner et al.

(10) Patent No.: US 6,256,618 B1
(45) Date of Patent: Jul. 3, 2001

(54) COMPUTER ARCHITECTURE USING SELF-MANIPULATING TREES

(76) Inventors: Christopher Spooner; Richard Spooner, both of 5505 Potomac Ave., NW., Washington, DC (US) 20016

( * ) Notice: Subject to any disclaimer, the term of this patent is extended or adjusted under 35 U.S.C. 154(b) by 0 days.

(21) Appl. No.: 09/064,824

(22) Filed: Apr. 23, 1998

(51) Int. Cl.$^7$ .................................................. G06F 15/18
(52) U.S. Cl. ...................................... 706/13; 717/8; 707/3
(58) Field of Search ................................... 717/8, 7, 5, 1, 717/2; 706/50, 59, 45, 13; 707/102, 100, 3, 5; 704/2, 9

(56) References Cited

U.S. PATENT DOCUMENTS

| | | | |
|---|---|---|---|
| 4,734,856 | 3/1988 | Davis | 706/62 |
| 5,161,203 | 11/1992 | Buckley | 382/157 |
| 5,175,798 | 12/1992 | Taylor et al. | 706/43 |
| 5,200,888 | 4/1993 | Hashimoto | 706/922 |
| 5,261,100 | 11/1993 | Fujinami et al. | 717/3 |
| 5,325,466 | * 6/1994 | Kornacker | 706/61 |
| 5,367,449 | 11/1994 | Manthey | 706/12 |
| 5,377,306 | 12/1994 | Broomhead et al. | 706/14 |
| 5,384,896 | 1/1995 | Sakaue et al. | 706/25 |
| 5,446,890 | 8/1995 | Renslo et al. | 707/104 |
| 5,450,314 | 9/1995 | Kagami et al. | 706/46 |
| 5,454,102 | * 9/1995 | Tang et al. | 707/3 |
| 5,475,793 | 12/1995 | Broomhead et al. | 706/14 |
| 5,479,570 | 12/1995 | Imagawa et al. | 706/20 |
| 5,526,522 | 6/1996 | Takeuchi | 717/2 |
| 5,555,345 | 9/1996 | Komori et al. | 706/25 |
| 5,630,123 | * 5/1997 | Hogge | 707/7 |
| 5,669,007 | * 9/1997 | Tateishi | 707/517 |
| 5,710,916 | * 1/1998 | Barbara et al. | 707/9 |
| 5,842,204 | * 11/1998 | Andrews et al. | 707/3 |
| 5,911,072 | * 6/1999 | Simonyi | 717/1 |
| 5,956,707 | * 9/1999 | Chu | 707/3 |

OTHER PUBLICATIONS

Gyssens et al., "A Grammar–Based Approach Towards Unifying Hierarchical Data Models," Proceedings of the 1989 ACM SIGMOD Int'l Conference on Management of Data and Symposium on Principles of Database Systems, May 31–Jun. 2, 1989, pp. 263–272.*

Ladd et al., "A*: a Language for Implementing Language Processors," Proceedings of the 1994 IEEE Int'l Conference on Computer Languages, May 16–19, 1994, pp. 1–10.*

Barendregt, An Intermediate Language Based on Graph Rewriting, 1988/89, pp. 163–177.

De Remer, Transformational Grammars for Languages and Compilers, Sep. 1975, pp. 427–433.

"The ML Approach to the Readable All–Purpose Language," Spooner, C.R., ACM Transactions on Programming Languages and Systems, vol. 8, No. 2, Apr. 1986, pp. 215–243.

"Elements Of The Theory Of Computation," Lewis, Harry R. et al., Prentice–Hall, Inc., Englewood Cliffs, NJ, 1981, pp. 95–153.

"Introduction To Artificial Intelligence," Charniak, et al., Addison–Wesley Publishing Company, Inc., 1985, pp. 194–214.

* cited by examiner

Primary Examiner—Kakali Chaki
Assistant Examiner—Tuan Q. Dam
(74) Attorney, Agent, or Firm—Venable; Michael A. Gollin; Jeffrey W. Gluck

(57) ABSTRACT

A computer architecture operates a computer using self-manipulating trees. A source is input and is matched to a self-manipulating tree using open-ended inviting to match identities to portions of the source. After activating the root node of the self-manipulating tree, the self-manipulating tree self-manipulates according to the instructions for self-manipulating contained in the identities pointed to by the nodes of the self-manipulating tree. The invention may be used as a natural language search engine for electronic data bases, a natural language programming language, a parser-free computer operating system, a computer problem solving system, and as an enhancement feature for general purpose computers and general purpose computer applications, such as a translator and a help engine.

28 Claims, 14 Drawing Sheets

Fig. 9A
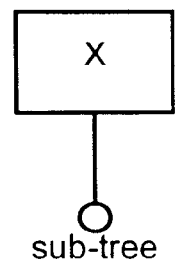
Fig. 9B
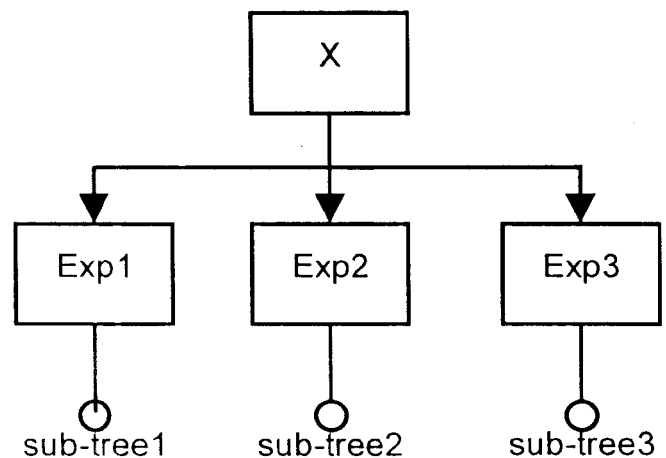
Fig. 9C
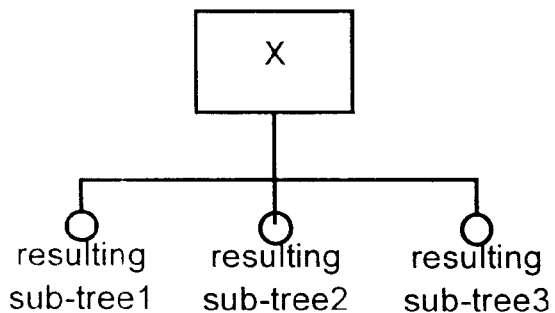
Fig. 9D
resulting
sub-tree2

COMPUTER ARCHITECTURE USING SELF-MANIPULATING TREES

BACKGROUND OF THE INVENTION

The invention relates generally to an architecture for operating a computer. More specifically, the invention relates to a method, an apparatus, and an article of manufacture for operating a computer, with applicability to a natural language search engine for electronic databases, a natural programming language, and a parser-free computer operating system.

Conventionally, computers are operated by inputting a request and having a parser parse the request to determine what is desired of the computer. The request is in an appropriate computer language, and the parser translates the request from the computer language to executable binary code using a set of parsing rules.

Computers are also conventionally operated by inputting information to the computer. For example, information can be conveyed by selecting an item from a menu, point-and-clicking on a button or an icon using a mouse, or entering text from a prompting question. When information is entered into a computer, the computer uses an external parser for understanding the input. For the above examples of conveying information to the computer, the parser is created using one or more computer programs using one or more appropriate computer languages.

One conventional approach to computer programming is object oriented computer programming. In object oriented programming, information within the computer is represented using an "object." An object is a data structure that specifies an internal representation for the computer and properties thereof. To manipulate the objects, a parser parses a set of object oriented program instructions and adds, deletes, or changes objects according to the parsed object oriented program instructions.

By using such conventional approaches to operating a computer, several drawbacks arise. For instance, to instruct a computer to perform certain actions, one needs to be familiar with a computer programming language, which includes an in-depth knowledge of the external rules used to communicate with the computer in this language. Learning how to program a computer and learning how to formulate instructions in a computer language based on the language's external rules are complex tasks.

Moreover, with this conventional approach, an external parser is required to parse instructions in the computer programming language. Hence, before the computer can take any action, the instructions in the computer programming language must be translated into executable code for the computer. This requires both a parser and steps required to use the parser.

As a further disadvantage with this conventional approach, computer programming languages are conventionally not in a natural language, such as English, German, or French. Instead, conventional programming languages are a species unto themselves and are not useful for communicating between humans, but only between human and computer. Hence, to learn to communicate with a computer, one needs to learn a computer programming language.

In addition, to use conventional computer program languages, a user needs to adapt to the computer, and the computer does not dynamically change to understand the user. This is caused by the conventional approach of how a computer understands a request from a user.

SUMMARY OF THE INVENTION

It is an object of the present invention to eliminate many of the inconveniences associated with the conventional operation of a computer.

Another object of the present invention is to eliminate the requirement of learning a computer programming language to operate a computer.

A further object of the invention is to permit operating a computer using a natural language.

A still further object of the present invention is to eliminate the use of an external parser in instructing a computer.

An additional object of the present invention is to eliminate the use of external rules for instructing a computer.

Yet another object of the present invention is to provide an approach for understanding information from a user using knowledge in the system.

An additional object of the present invention is to provide for storing knowledge in a computer to enable ease of understanding by the computer.

A further object of the present invention is to provide an approach for interpreting information conveyed by a user to a computer.

The above objects and advantages of the present invention are achieved by a method, an apparatus, and an article of manufacture for operating a computer using self-manipulating trees.

According to the invention, a computer architecture operates a computer using self-manipulating trees. A source is input and is matched to a self-manipulating tree using open-ended inviting to match identities to portions of the source. After activating the root node of the self-manipulating tree, the self-manipulating tree self-manipulates according to the instructions for self-manipulating contained in the identities pointed to by the nodes of the self-manipulating tree. The invention may be used as a natural language search engine for electronic data bases, a natural language programming language, a parser-free computer operating system, a computer problem solving system, and as an enhancement feature for general purpose computers and general purpose computer applications, such as a translator and a help engine.

The method comprises a method for operating a general purpose computer comprising: inputting a source; matching identities to the source using open-ended inviting to obtain a self-manipulating tree, wherein instructions for obtaining the self-manipulating tree are contained within the identities; and activating the self-manipulating tree to operate the computer.

The apparatus comprises a computer architecture comprising: a general purpose computer; and a computer-readable medium comprising a plurality of executable code, a plurality of self-manipulating trees, and a plurality of standard identities.

The apparatus further comprises an apparatus for accessing information from a network comprising: a general purpose computer connected to the network and having an input for receiving a source; and a computer-readable medium comprising a self-manipulating tree matched to the source, the self-manipulating tree being matched to identities using open-ended inviting, the self-manipulating tree being activated to access information from the network.

The article of manufacture comprises a computer-readable medium comprising: executable code; a self-manipulating tree; and a plurality of standard identities.

The article of manufacture further comprises a computer-readable medium comprising code segments for accessing information requested by a source input to a general purpose computer connected to a network, the code segments comprising: a self-manipulating tree matched to the source, the self-manipulating tree being matched to identities using open-ended inviting, the self-manipulating tree being activated to access information from the electronic data network.

For the present invention, the apparatus comprises a general purpose computer and code segments to control the general purpose computer, such as: software; instructions; computer programs; executable code; and any means for controlling a general purpose computer. In addition, the general purpose computer may include the ability to communicate with other general purpose computers.

For the present invention, the computer-readable medium embodying the computer program comprises code segments to control a general purpose computer. Examples of a "computer-readable medium" include: a magnetic hard disk; a floppy disk; an optical disk, such as a CD-rom or one using the DVD standard; a magnetic tape; a memory chip; a carrier wave used to carry electronic data, such as those used in transmitting and receiving electronic mail or in accessing a network, such as the Internet, a wide area network, or a local area network ("LAN"); and any device for storing data and readable by a general purpose computer.

A "general purpose computer" refers to a device having a processing unit, memory, the capacity for receiving input, and the capability for generating output, as well as other computers and computing systems, and is intended to encompass appropriate special purpose data processors.

The present invention can be used for many applications. Examples of such applications include: a computer architecture, a natural language search engine for electronic data bases; a natural language programming language; a computer operating system; a computer problem solving system; and as an enhancement feature for computers or computer applications, such as a translator and a help engine.

The objects, advantages, and examples of the present invention are illustrative and not exhaustive of those which can be achieved by the present invention. These and other objects, advantages, and examples of the present invention will be apparent from the description herein or can be learned from practicing the invention, both as embodied herein and as modified in view of any variations which may be apparent to those skilled in the art.

BRIEF DESCRIPTION OF THE INVENTION

The invention is better understood by reading the following detailed description with reference to the accompanying figures, in which like reference numerals refer to like elements throughout, and in which:

FIGS. 9A–9D illustrate open-ended inviting of an exemplary self-manipulating tree.

DETAILED DESCRIPTION

Figure 1:
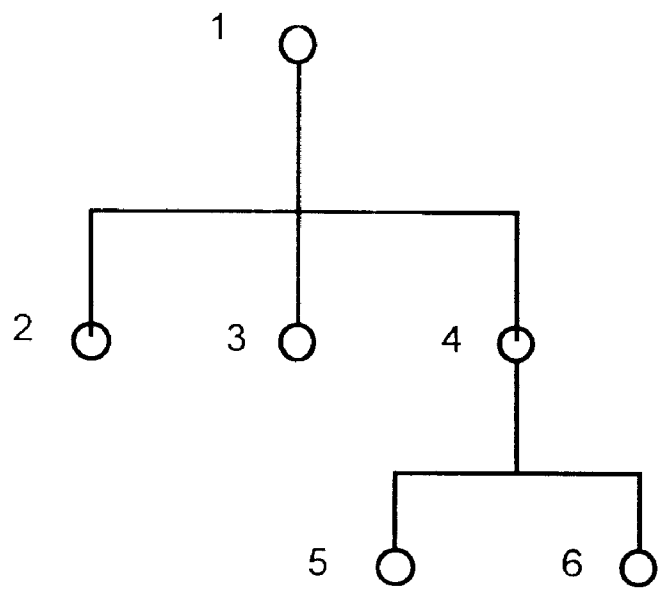
FIG. 1 is a diagram illustrating the nodes of an exemplary self-manipulating tree.

In describing the present invention in detail and as illustrated in the drawings, specific terminology is employed for the sake of clarity. The invention, however, is not intended to be limited to the specific terminology so selected, and it is to be understood that each specific element includes all technical equivalents which operate in a similar manner to accomplish a similar purpose.

FIRST EMBODIMENT

The detailed description of a first embodiment is divided into a description of self-manipulating trees, matching self-manipulating trees, and activating self-manipulating trees.

Self-Manipulating Trees

The basic building block of the invention is a self-manipulating tree ("SMT"). As illustrated in FIG. 1, a SMT is comprised of nodes and hierarchical connections therebetween. A root node 1 sits atop the SMT, and the remaining nodes 2–6 are hierarchically connected to root node 1. Nodes 2–4 are children nodes of root node 1. Nodes 5–6 are children nodes of node 4 and grandchildren nodes of root node 1. Nodes 2–4 are sibling nodes, and nodes 5–6 are sibling nodes.

Figure 2:
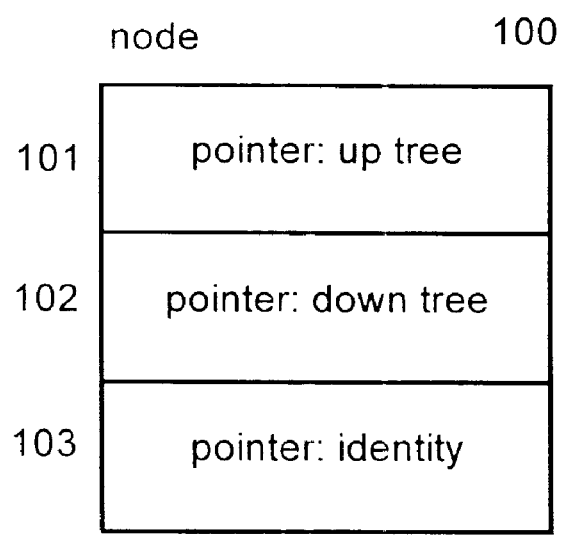
FIG. 2 is a diagram illustrating a data structure for a node in a self-manipulating tree.

Each node in the SMT has a data structure, which is illustrated in FIG. 2. The data structure 100 has three components: a pointer 101 for pointing to nodes above the node; a pointer 102 for pointing to nodes below the node; and a pointer 103 for pointing to an identity for the node. If the node is a root node, the pointer 101 is a null. If the node is not a root node, pointer 101 will only point to one node. Pointer 102 can point to zero, one, or multiple nodes. Pointer 103 points to an identity, which can take several forms as described below.

For example, for node 1 in FIG. 1, pointer 101 is null, and pointer 102 points to nodes 2, 3, and 4. For node 4, pointer 101 points to node 1, and pointer 102 points to node 5 and 6. For node 6, pointer 101 points to node 4, and pointer 102 is null.

Alternatively, pointer 101 can point to the sibling node to its right, and pointer 102 can point to its leftmost child. For example, for node 1 in FIG. 1 using this alternative for pointers 101 and 102, pointer 101 is null, and pointer 102 points to node 2. For node 2, pointer 101 points to node 3, and pointer 102 is null. For node 3, pointer 101 points to node 4, and pointer 102 is null. For node 4, pointer 101 is null, and pointer 102 points to node 5.

As another alternative, any arrangement of pointers for pointing across and down the SMT or for navigating through the SMT can be used.

As a further alternative, any information for navigating through the SMT or for identifying relationships between nodes in the SMT can be used.

As an alternative to representing the information of the node 100 using the data structure 100, any means that can hold the information of the node 100 can be used. Moreover, the information of node 100 does not need to reside together in memory, but may be fragmented on the computer-readable medium or scattered throughout a network.

Figure 3:
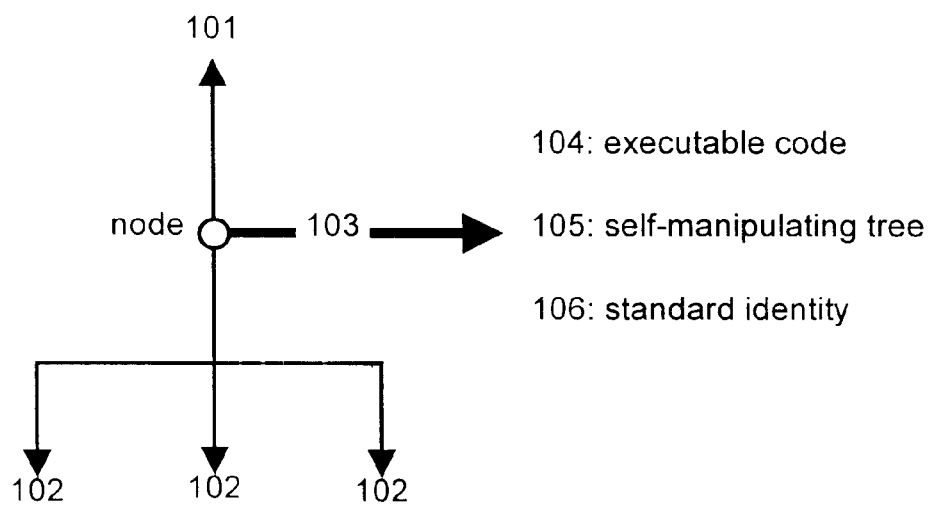
FIG. 3 is a diagram illustrating the connections for a node of a self-manipulating tree.

In FIG. 3, the data structure 100 is illustrated. The pointer 101 points to a node above the node. Pointer 102 points to nodes below the node. Pointer 103 points to the identity for the node. This identity can take the form of either executable code 104, another SMT 105, or a standard identity 106.

As one of the three possibilities, pointer 103 can point to executable code 104. Executable code 104 comprises code segments for operating the computer without further translation. An example of executable code is binary code. Alternatively, executable code can include code segments which require translation using a conventional parser. Examples of computer languages for which executable code can be written include: C++, JAVA, and SQL computer programming languages. In this alternative embodiment, a parser is required to translate the executable code into machine readable code, such as binary code.

As a second possibility, the pointer 103 can point to another SMT 105. This indicates that the node of the SMT points to another SMT 105. Alternatively, the pointer 103 can point recursively to the SMT of which it is a part.

As the third possibility, the pointer 103 can point to a standard identity 106, which contains a representation of the internal knowledge of the computer.

Figure 4:
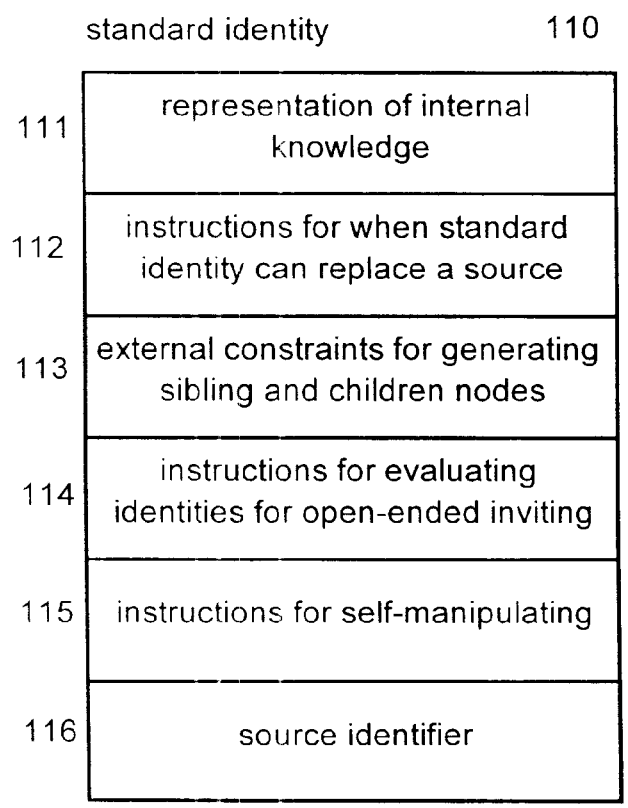
FIG. 4 is an illustration of a data structure for a standard identity.

In FIG. 4, the data structure 110 for a standard identity 106 is illustrated. The data structure 110 comprises several types of data: representation 111 of internal knowledge; instructions 112 for whether the standard identity can replace selected source; external constraints 113 for generating sibling and children nodes; instructions 114 for evaluating identities from open-ended inviting; instructions 115 for self-manipulating the standard identity; and source identifier 116. Alternatively, pointers can be used for pointing to the data 111–116. As an alternative to representing the data of the standard identity 106 using the data structure 110, any means that can hold the information of the standard identity 106 can be used. Moreover, the information of standard identity 106 does not need to reside together in memory, but may be fragmented on the computer-readable medium or scattered throughout a network.

The representation 111 of internal knowledge comprises a data structure for representing the state of the computer. For example, representation 111 could represent a list or an item in a list.

The types of data comprising the data structure 110 can vary according to instructions 115. In particular, 112–114 and 116 may each be required or not required depending on instructions 115.

Further explanation of instructions 112, external constraints 113, instructions 114, instructions 115, and source identifier 116 are described below.

Matching Self-Manipulating Trees

Figure 5:
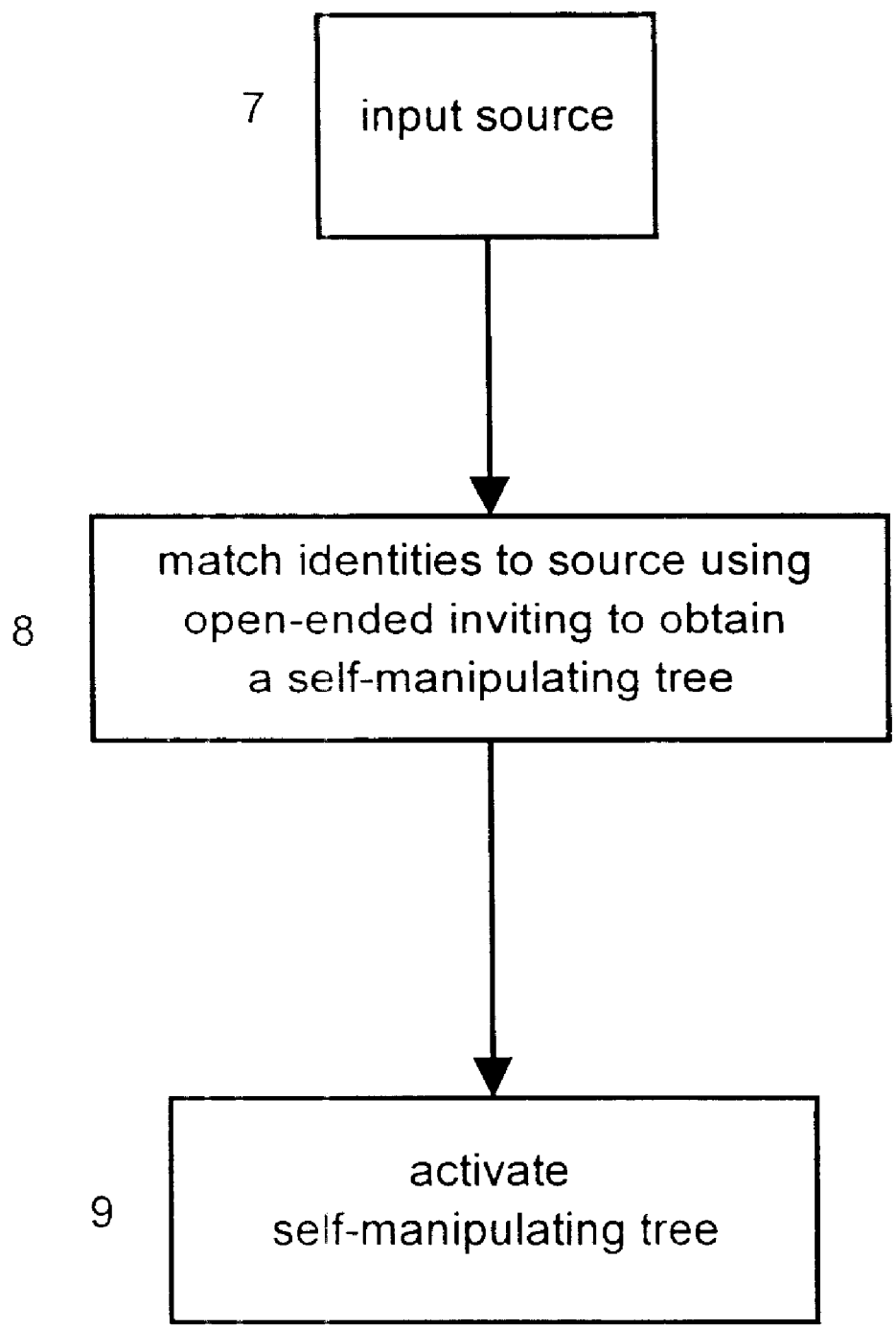
FIG. 5 is a functional block diagram illustrating a first embodiment of the invention.

In FIG. 5, the operation of a computer using a SMT is illustrated for the first embodiment.

In block 7, a source is input to the computer. In a preferred embodiment, the source is a text string, which is input using a keyboard, or a mouse. Alternatively, the source can be read from a computer-readable medium. As another alternative, the source can be speech or handwriting, which is input to the computer using an appropriate input device, such as a microphone or a stylist input device, respectively. As a further alternative, the source can be computer icons, tables, graphs, pictures, or any other indicia of knowledge able to be input to the computer. All of these alternatives are encompassed within the definition of "input" as used herein. Once input, the source from block 7 becomes a SMT containing the source and, in addition, one or more standard identities.

In block 8, the source from block 7 is matched to identities using open-ended inviting to obtain a SMT representative of the source. In other words, in block 8, the source input in block 7 is replaced with a SMT as the internal representation of the source within the computer. The method for performing the function in block 8 is illustrated in the functional block diagrams of FIGS. 6–8.

Figure 6:
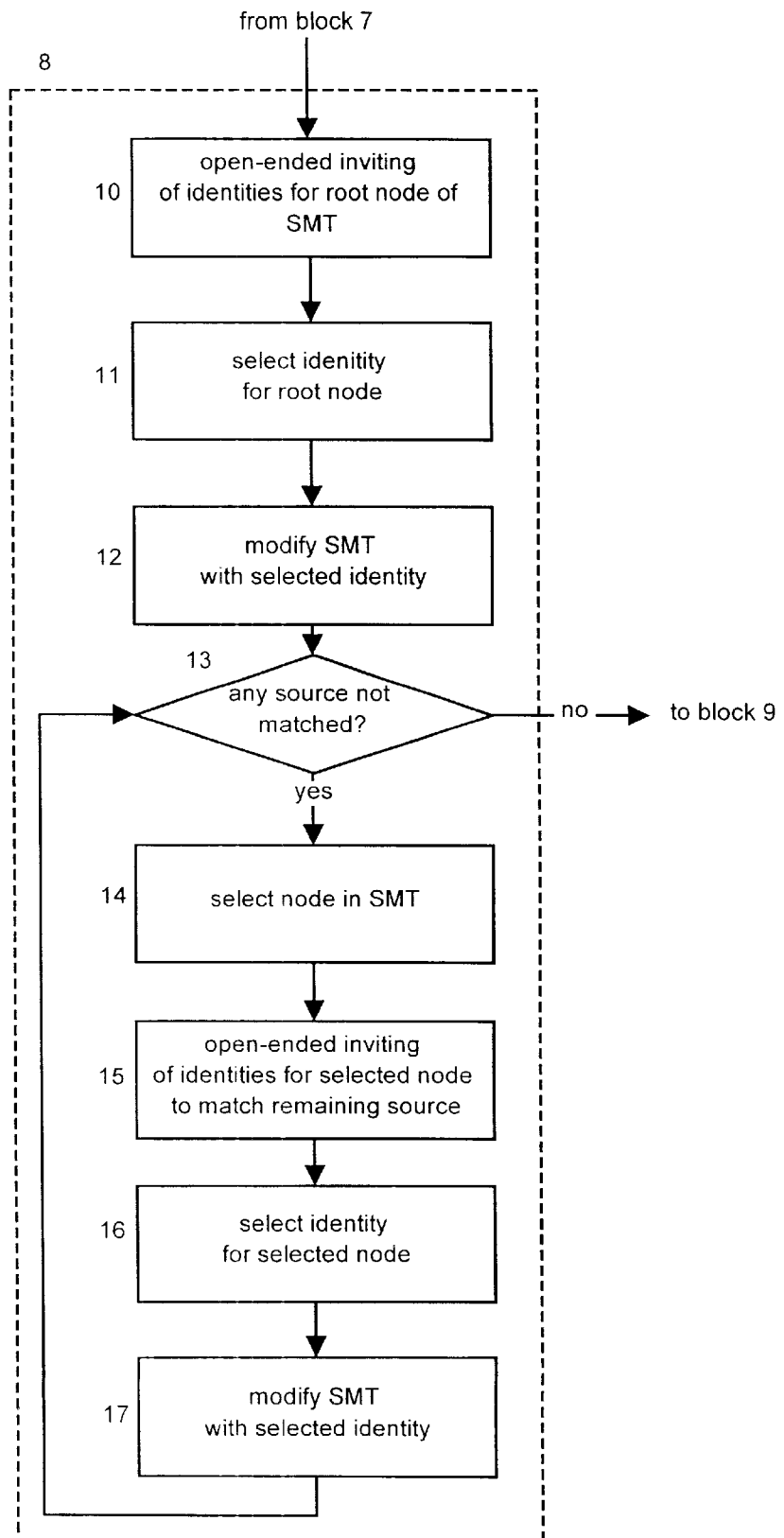
FIG. 6 is a functional block diagram illustrating block 8 of FIG. 5.

In FIG. 6, a detailed functional block diagram of the matching in block 8 is illustrated.

In block 10, using open-ended inviting, identities are identified for the root node of the SMT for the source. Open-ended inviting is a method for experimenting to determine which identities are appropriate for use with the root node of the SMT for the source.

More generally, open-ended inviting is a method for intelligent problem solving. Intelligence is not the same as access to a vast amount of information. Instead, intelligence is in selecting which information to use, recognizing when a line of reasoning is leading nowhere, and judging between the conclusions from the various lines of reasoning. Open-ended inviting is a method for accomplishing this. In particular, for the root node or any other node in the SMT, open-ended inviting enables the computer to determine: which identities to invite for use with the node; recognizing when an experiment to ascertain the ability to use the identity with the node should be abandoned; and judging between the results from the various experiments as to ascertain whether an identity can be used with a node.

Further, open-ended inviting is experimental based and recursive. Using open-ended inviting, several identities are invited to be used with the root node. For each identity invited, an experiment is performed to ascertain whether the identity is appropriate for use with the root node, in part according to the identity's children nodes. Each of the experimenting identities invites other identities for use with the children nodes below it. The children nodes created below the experimenting root node also use open-ended inviting for selecting identities to be used therewith. This recursion continues until it can be determined whether the initial experimenting identity can be used with the root node. Once one is found, children of the root node are established, and open-ended inviting continues on for the children nodes, and the grandchildren nodes, and so on. Depending on the embodiment of the invention, the recursion can be performed once or a multiple number of times.

In a preferred embodiment, this recursion continues separately down each branch of the developing SMT, and stops whenever a leaf is reached or a node fails to be satisfied. As the recursion unwinds up each branch, results are transmitted up the SMT. If a node receives "success" from each of its children nodes, the experimenting identity at that node is confirmed as successful, unless further tests required by the experimenting identity fail. Regardless of the results from any of its child nodes, the experimenting node then proceeds to combine them into a single result for the experiment above.

In a preferred embodiment, open-ended inviting is used to match the source from block 7 to identities. With open-ended inviting, the source is translated to an internal representation within the computer, which is both in a computer manipulatable format and is comprehended by the computer. This has an advantage over conventional computer systems, in which the translation of text into a computer manipulable format and a comprehendible format are two distinct operations.

With the invention, the two goals of placing the source into a proper format and understanding the source are accomplished simultaneously. With open-ended inviting, the translation and comprehension of the source are accomplished using experimentation according to the instructions and external constraints of the data structure 110 for each identity.

Conventionally, these instructions and external constraints are contained in a parser. In the invention, however, these instructions and external constraints are part of the identities themselves. The identities, whether selected for a node or experimenting to ascertain whether they are appropriate for the node, direct the translation and comprehension of the source. Hence, with the invention, external rules and a parser for implementing such external rules are not required.

Figure 7:
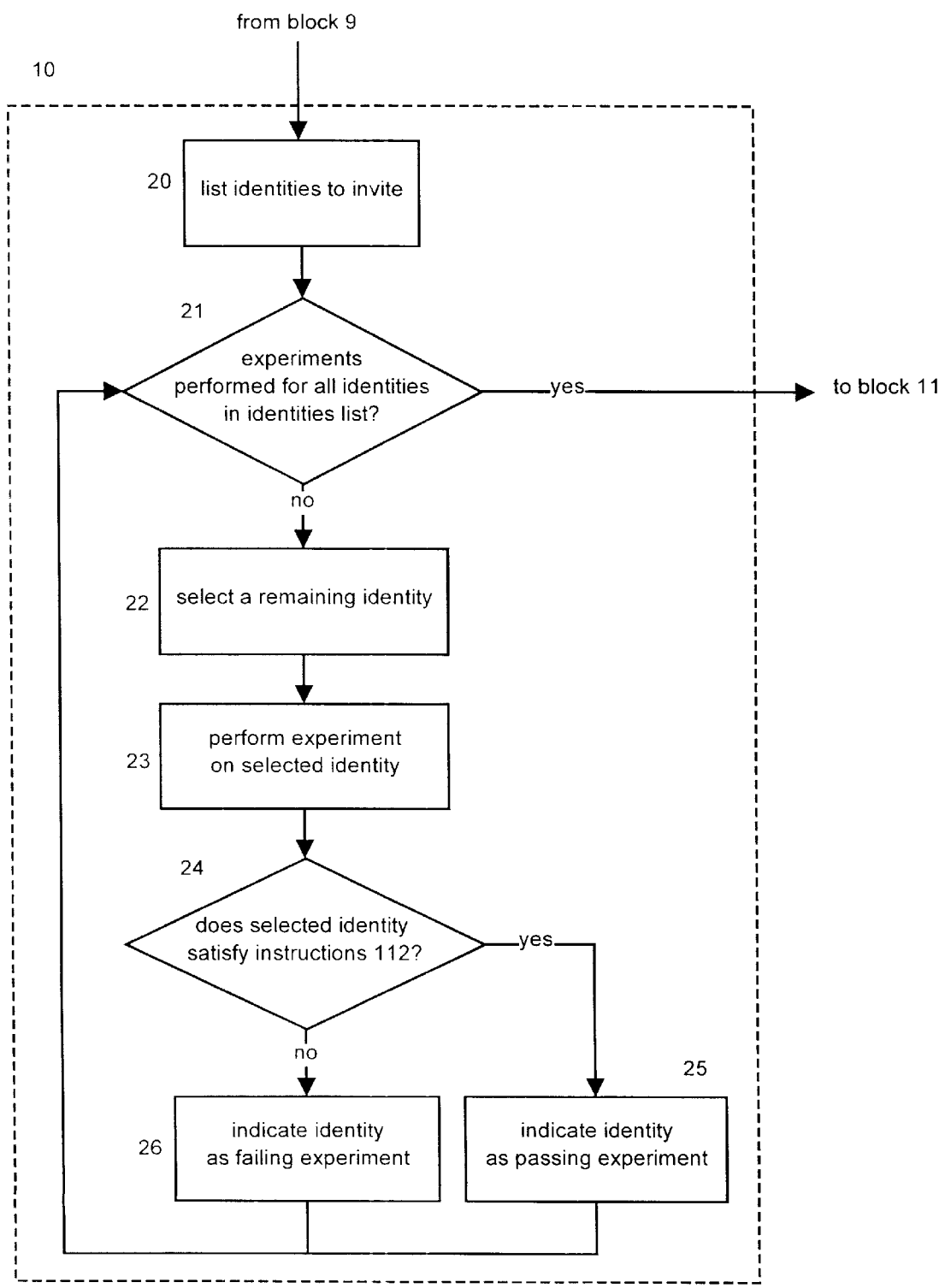
FIG. 7 is a functional block diagram illustrating block 10 of FIG. 6.

In FIG. 7, block 10 is illustrated with a functional block diagram. In block 20, the source from block 7 is used to invite identities. In particular, a list of identities is created to use with the root node of the SMT. This identities list includes both identities corresponding to portions of the source and invisible identities. Identities corresponding to portions of the source are identities which can "see themselves" in the source. In a preferred embodiment, if the identity's source identifier 116 from its data structure 110 matches a portion of the source, the identity is included in the identities list.

As an example of identities corresponding to portions of the source, consider the source: "? four+five." With this source, the identities for "?," "four," "+," and "five" would be invited and included in the identities list.

Further, the source identifier 116 for the identity is not limited to a single identifiable portion of the source. For the above example, an identity with the source identifier 116 of "? X+Y" for a discontinuous portion of the source can be invited, where "X" and "Y" are wild card variables.

Besides discontinuous portions of the source, continuous portions of the source can also be used as the source identifier 116. For example, identities for the source identifiers 116 of "What time is it" and "What is the time" can exist. These identities are invited to be part of the identities list when the source is, respectively, "What is the time now?" and "What is the time in Berlin?".

Invisible identities are identities which have as the source identifier 116 of their data structure 110 a null. In other words, the invisible identities have no corresponding portions in the source. In a preferred embodiment, all invisible identities are always included in the identities list created in block 20.

Alternatively, conditions for including invisible identities which do not correspond to portions of the source can also be included. Such constraints can be included instead of the source identifier 116, or alternatively, as an additional element of the data structure 110.

An example of an invisible identity is the implied multiplication. This invisible identity is relevant when the source is text and includes a number next to an open parenthesis. Another example of an invisible identity available under certain circumstances is the one available when "for whom" is included in a source of text. Not only is there an identity with the source identifier 116 of "for whom," but there is also an invisible identity which is available when "for whom" occurs in a source of text. This invisible identity corresponds to text such as "all men older than 50" and treats the text as though it were "all men for whom their age is greater than 50."

In block 21, it is determined whether experiments were performed for all of the identities in the identities list from block 20. The experiments performed for each identity are discussed below for block 23. If experiments have not been performed for all of the identities in the identities list, the flow moves to block 22. If experiments have been performed for all of the identities in the identities list, the flow returns to block 11 in FIG. 6.

If experiments have not been performed for all of the identities in the identities list in block 21, a remaining identity with which to experiment is selected in block 22. This selecting can be performed in an ordered or an unordered manner. With an ordered approach, the identities in the identities list are ordered, and in block 22 this ordered identities list is serially stepped through by selecting the next identity on the list. Examples of ways to order the identities list include: alphabetically, numerically by the numeric address in memory for each identity, and chronologically with respect to the placement of each identity in the identities list in block 20. With an unordered approach, an identity is selected at random from the remaining identities in the identities list. Alternatively, the identity performing the inviting can modify the order of the list, or modify the list itself, based on the results thus far from the experiment.

In block 23, an experiment is performed on the selected identity from block 22. The experiment uses the instructions 112 for determining whether the identity can replace the source. In a preferred embodiment, the instructions 112 use the source identifier 116 for initially determining which portion of the source the identity can match. With a portion of the source matched, there remains a subset of the source needing to be matched.

Next, the instructions 112 use the external constraints 113 for sibling and children nodes. The instructions 112 attempt to match the subset of the source to the required sibling and children nodes from external constraints 113.

As an example, consider the text source of "set X to 5," and assume that the "set" identity has been selected in block 22. According to the external constraints 113, the "set" identity has two children nodes which are two prepositions. Here, the term "preposition" means a satellite identity dedicated to a parent identity and represents the external requirements to be imposed on one of the parent's child nodes. A preposition can optionally be "visible," in which case it requires a section of text for which to match itself. A preposition removes itself from the tree when it has matched its child node. Alternatively, the preposition can be a part of the parent identity, and the function of the preposition can be included as part of the instructions 115 for self-manipulating of the parent identity.

For the above example, external constraints 113 require that the first child node be an invisible preposition, and that the second child node be the "to" preposition. Further, external constraints 113 require that the identities invited by both prepositions be compatible with each other.

In the first recursion of the "set" identity example, the invisible preposition performs an open-ended inviting similar to that discussed for block 10 of FIG. 6. If only one identity succeeds in this inviting, which is the "X" identity, the "X" identity is then matched to the "X" portion of the text source "set X to 5."

Next, the "to" preposition performs an open-ended inviting of identities similar to that performed in block 10 of FIG. 6. Assume that the "5" identity is the only successful identity. The "to" preposition and the "5" identity have thus matched the "to" subset and the "5" subset respectively of the text source.

To determine whether the invisible prepositions and the "to" preposition were matched correctly, the instructions 112 use instructions 114 for evaluating identities from open-ended inviting. Instructions 114 can have any form or content. For example, instructions 114 might specify the kind of information that is expected to be passed when the SMT is "executed."

Hence, the instructions 112 have verified that the "set" identity can replace the text source of "set X to 5."

In block 24, it is determined whether the selected identity from block 22 satisfies instructions 112. If yes, the flow moves to block 25, and if no, the flow moves to block 26.

In block 25, after determining that the selected identity from block 22 satisfies instructions 112, the selected identity is indicated as passing the experiment. With this designation, the selected identity can be used to replace the portion of the source to which the selected identity was matched. For the example above, the "set" identity can be used to replace the entire source of "set X to 5."

In block 26, after it was determined in block 24 that the selected identity does not satisfy instructions 112, the selected identity is indicated as failing the experiment. In this case, the selected identity can not be used to replace any portion of the source. After either block 25 or block 26, the flow proceeds back to block 21.

As an alternative to blocks 21–26, the experiments for each of the identities in the identities list can be performed in parallel. In this case, each of the identities in the identities list is passed to a separate processor for performing the experiment. Once the parallel processing is completed, the flow returns to block 11 in FIG. 6.

In block 11 of FIG. 6, an identity is selected for the root node. In a preferred embodiment, either zero, one, or more than one identities can be indicated as passing the experiments performed in block 10. This is illustrated in the functional block diagram of FIG. 8 for block 11.

Figure 8:
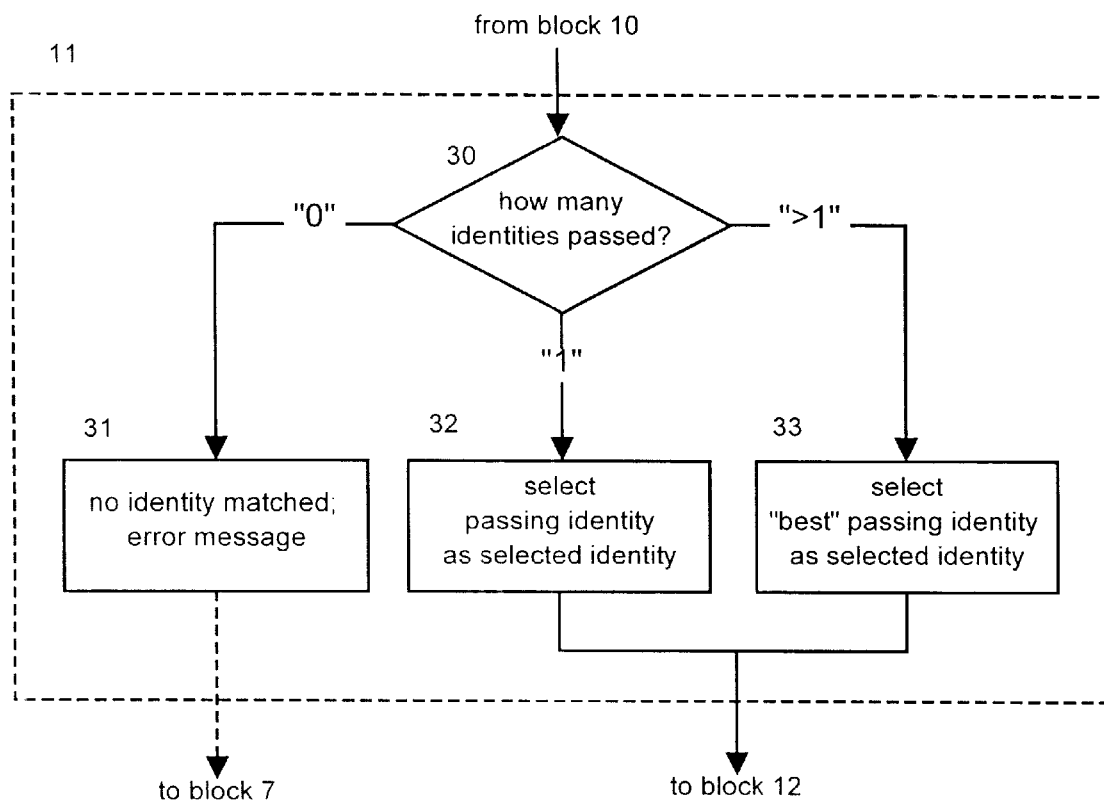
FIG. 8 is a functional block diagram illustrating block 11 of FIG. 6.

In block 30 of FIG. 8, it is determined how many identities in the identities list passed the experiments from the open-ended inviting in block 10. If none passed, the flow proceeds to block 31. If one identity passed, the flow proceeds to block 32. If more than one identity passed, the flow proceeds to block 33.

In block 31, an error message is passed to the user that the source was unable to be translated and comprehended. Alternatively, with the error message, the user can be prompted to modify the source or input a new source. This alternative is indicated by the dashed flow line from block 31 in FIG. 8. Alternatively, when an experiment fails, or produces an ambiguity, the experimenting identity could determine why the experiment failed, or decide between the alternative results as a further problem to be solved, and apply open-ended inviting again to solve this further problem. To solve this further problem, the experimenting identity could enlist the knowledge in the system to determine what the user intended to say, or really meant.

In block 32, one identity passed the experiments of the open-ended inviting in block 10, and this identity is selected for the root node of the SMT. In the data structure 100 for the root node, the pointer 103 is modified to point to the identity selected.

In block 33, more than one identity passed the experiments from the open-ended inviting in block 10. In this case, the instructions 114 of the identity performing the experiment can cause a reply of "ambiguous" to be passed up the tree to a node above whose identity will correct the situation. Alternatively, the experimenting identity can select one of the candidates according to some criterion that is identity-dependent.

As an alternative to selecting the best matching identity in block 33, the user can be presented with all the passing identities or a partial listing of the passing identities. Examples of a partial listing of the passing identities include: a partial listing of the best passing identities as ranked according to a criterion; a partial listing of an alphabetized ordering of the passing identities; and a partial listing of the passing identities ranked chronologically according to the time each was listed as a passing identity.

After an identity is selected in block 32 or 33, the flow proceeds from FIG. 8 to block 12 in FIG. 6. In block 12, the SMT is modified according to the identity selected. The manner for modifying the SMT is contained in the external constraints 113 for creating sibling and children nodes.

For example, consider the text source "? four+five." Assume that the "?" identity was matched with the root node in block 11, and assume the external constraints 113 for the data structure 110 of the "?" identity indicate that there is one child for this identity. The SMT is then modified to have a root node and one child node for the root node. This child node points to the remaining subset of the source, namely "four+five."

In block 13, it is determined whether any source is remaining to be matched. If all the source has been matched, the flow proceeds to block 9 in FIG. 5. When this occurs, the entire source has been replaced by a SMT. If there is still source remaining to be matched, the flow proceeds to block 14.

In block 14, one of the nodes in the SMT which is not yet matched to a portion of the source is selected. In a preferred embodiment, each identity which can be used as a root node creates at least one sibling node or at least one child node. With this assumption, there will be a subset of the source remaining to be matched, and at least one node in the SMT for which to match the remaining source.

In block 15, open-ended inviting of identities is performed for the selected node in order to match the remaining source. This open-ended inviting is similar to that performed for block 10 and in FIG. 7. To perform the open-ended inviting in block 15, the flow of FIG. 7 is modified slightly. Instead of passing the source to block 20, a subset of the source as well as the external constraints 113 from the node above the selected node are passed to block 20. Further, in block 24, the selected identity needs to not only satisfy instructions 112 of the selected identity but also satisfy the external constraints 113 from the selected node.

In block 16, an identity indicated as passing the experiments from the open-ended inviting in block 15 is selected for the selected node of block 14. The procedure for block 16 is the same as that for block 12 in FIG. 8. The pointer 103 of the selected node is modified to point to the identity selected in block 16.

In block 17, the SMT is modified per the selected identity from block 16. In a preferred embodiment, this occurs in the same manner as discussed above for block 12. After the SMT is modified, the flow returns to block 13.

Hence, in FIG. 6, a preferred embodiment for replacing text with a SMT as in block 8 of FIG. 5 is described.

Examples of Matching Self-Manipulating Trees

In FIGS. 9A–9D, the functionality of several blocks in FIGS. 6–8 are illustrated. In FIG. 9A, the identity "X" has been chosen as the root node in block 11, and the sub-tree below the root node is the modified part of the SMT per block 12. The external constraints 113 of the "X" identity require only one child node, which is indicated as the sub-tree.

In FIG. 9B, the single child node of the root node is selected as the node for experimenting in block 14. Open-ended inviting for this node is conducted in block 15. From block 20, three identities were selected to be in the identities list, namely Exp1, Exp2, and Exp3. In block 23, each of the invited identities performs an experiment to determine its suitability being the identity for the child node of the root node.

In FIG. 9C, each of the invited identities has satisfied the instructions 112 of the root node in block 24 and has been indicated as passing in block 25. The results for the three experiments of the three invited identities are indicated as the possibilities below the root node.

In FIG. 9D, the root node determines that the second invited identity is the best in block 33. In block 17, the SMT is modified to contain only the resulting sub-tree 2 per the instructions 115 for self-manipulating.

Figure 10A:
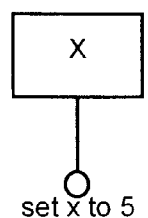
FIGS. 10A–10D illustrate open-ended inviting of an exemplary self-manipulating tree.

In FIGS. 10A–10D, the matching of the source to a SMT is illustrated with reference to FIGS. 6–8. In FIG. 10A, the root node points to the "X" identity, and the external constraints 113 for the "X" identity have one child node. The remaining portion of the source is "set x to 5" and has been associated with the single child node of the root node per block 12.

Figure 10B:
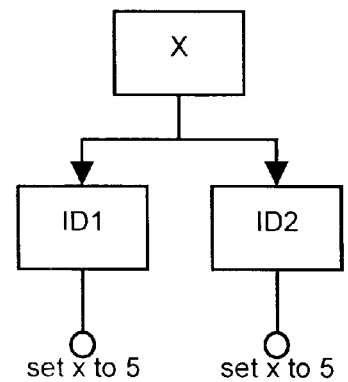

In FIG. 10B, two identities, namely the "ID1" identity and the "ID2" identity, are invited via open-ended inviting per block 15 to be in the identities list per block 20. Each of these identities in the identities list is tasked in blocks 21–23 to perform experiments to determine whether the identity can appropriately match the remaining source of "set x to 5."

Figure 10C:
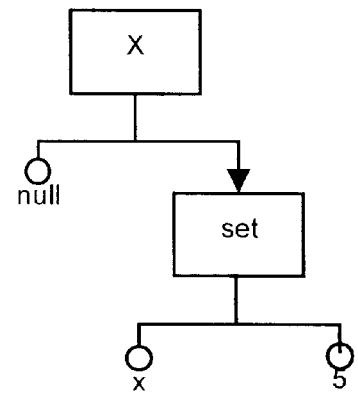

In FIG. 10C, the results after these experiments are illustrated. For the "ID1" identity, the identity failed to satisfy the external constraints of the root node. This identity was indicated in block 26 as failing, which is illustrated with a null. However, the "ID2" satisfied the external constraints of the root node and was indicated in block 25 as passing. The results of the experimenting for the "ID2" identity are shown in FIG. 10C.

Figure 10D:
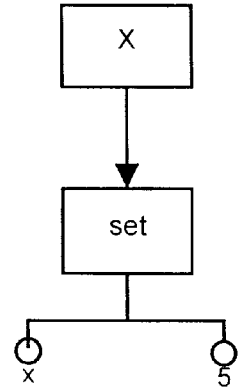

In FIG. 10D, the root node selects the "ID2" identity as the identity for the child node of the root node in block 32. In block 17, the SMT is modified by replacing the child node with the resulting SMT from the "ID2" identity.

Activating Self-Manipulating Trees

Figure 11:
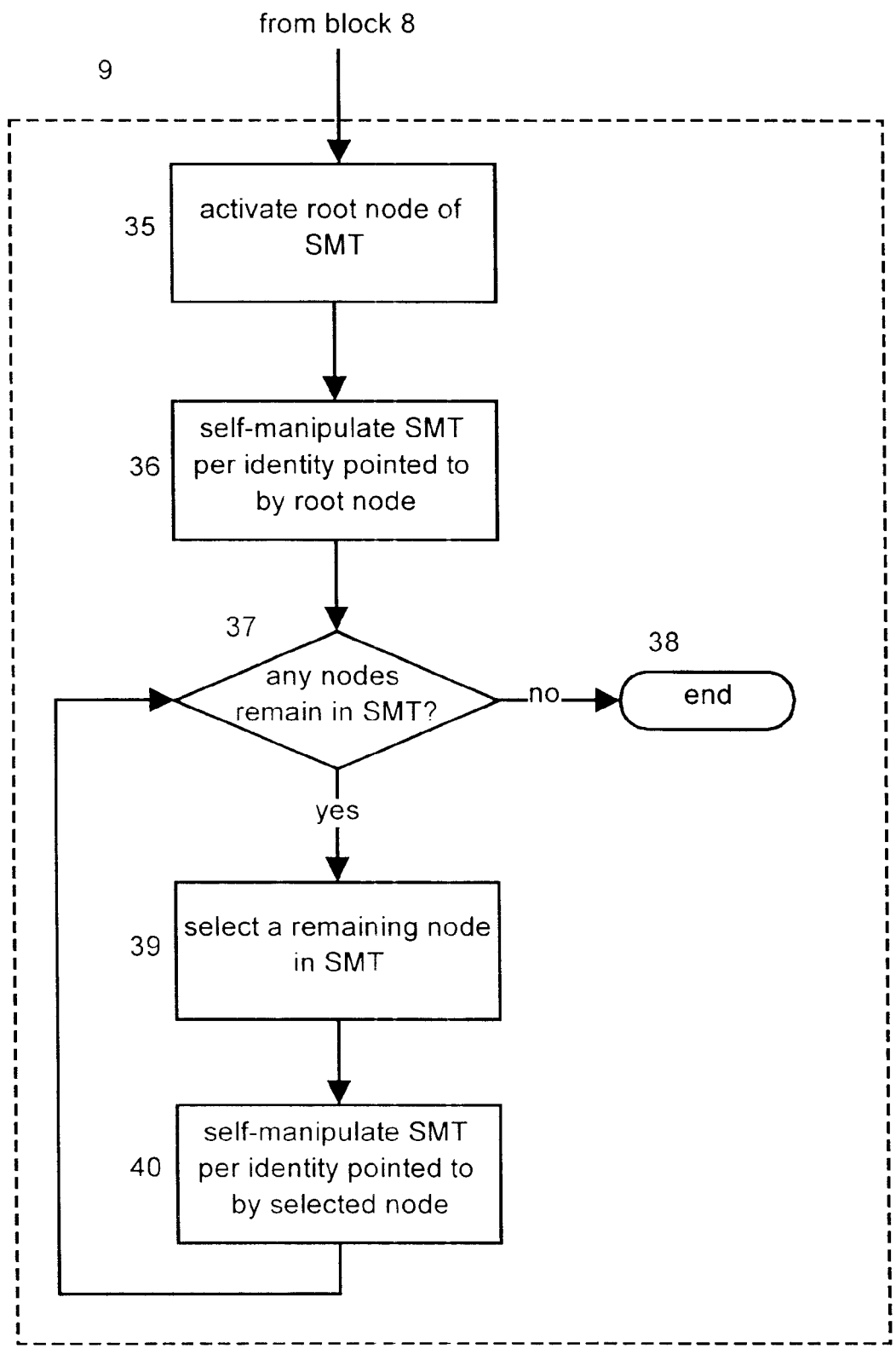
FIG. 11 is a function block diagram illustrating block 9 of FIG. 5.

In block 9 of FIG. 5, the self-manipulating tree created in block 8 is activated. Alternatively, any SMT stored in memory or transferred from another computer can be activated. In FIG. 11, a functional block diagram illustrates a preferred embodiment for activating a SMT.

In block 35 of FIG. 11, to activate a SMT, the root node of the SMT is activated. Here, "activate" means that the control of the computer is under the direction of the SMT, or a node of the SMT.

In block 36, the SMT is self-manipulated according to the identity pointed to by the root node. Self-manipulation of a SMT occurs for a "purpose" (e.g., the purpose of matching). The purpose for the current self-manipulation is referred to as the "current purpose." The pointer 103 of the data structure 100 of the root node points to the identity for the root node. As described above, the identity can be one of three possibilities: executable code; another SMT; or a standard identity.

If the identity is executable code, the code is executed when the root node is activated. If the identity is another SMT, the another SMT is activated when the root node is activated. If the identity is a standard identity, and if the root node has instructions 115 for the current purpose, the SMT is modified per the instructions 115 for self-manipulating in the data structure 110 of the identity for the root node. Examples of instructions 115 include: replacing the node and its subtree by another subtree; or making a calculation, and inserting additional child nodes to record the results.

In block 37, after the SMT has been self-manipulated according to the root node, it is determined whether there are any nodes remaining in the SMT. If there are no nodes remaining in the SMT, the activation of the SMT is complete, and the control of the computer by the SMT is relinquished in block 38. If, however, there are still nodes remaining in the SMT, the flow proceeds to block 39.

In block 39, the SMT is self-manipulated according to the identities of the remaining nodes in the SMT. The order of selecting nodes in the SMT for self-manipulating the SMT can be pre-ordained or not. If the order is determined beforehand, this order is followed in selecting nodes and their respective identities for self-manipulating the SMT. In a preferred embodiment, the instructions 115 for self-manipulating in the data structure 110 of the identity at each node is responsible for activating the child nodes of that node in an appropriate order. If the identity does not have instructions 115 self-manipulating for the current purpose, the child nodes are automatically activated in order. If the ordering is not determined beforehand, the nodes of the SMT are selected at random. Hence, in block 39, a node is selected for directing the self-manipulation of the SMT.

In block 40, the identity associated with the selected node from block 39 is used to direct the self-manipulation of the SMT. The instructions 115 for self-manipulating of the data structure 110 of the standard identity chosen in block 39 is used to self-manipulate the SMT. As discussed above for block 36, there are three possibilities for self-manipulating the SMT in block 40. After the SMT is self-manipulated in block 40, the flow returns to block 37.

In a preferred embodiment, in blocks 36 and 40, the self-manipulation of the SMT according to the instructions 115 for self-manipulating in the data structure 110 of the standard identity has twelve stages known collectively as "refinement." Alternatively, refinement may involve more or fewer steps as will become apparent to the those skilled in the art. For example, the twelve stages of refinement may be split, combined, or deleted, and additional stages may be added.

Figure 12:
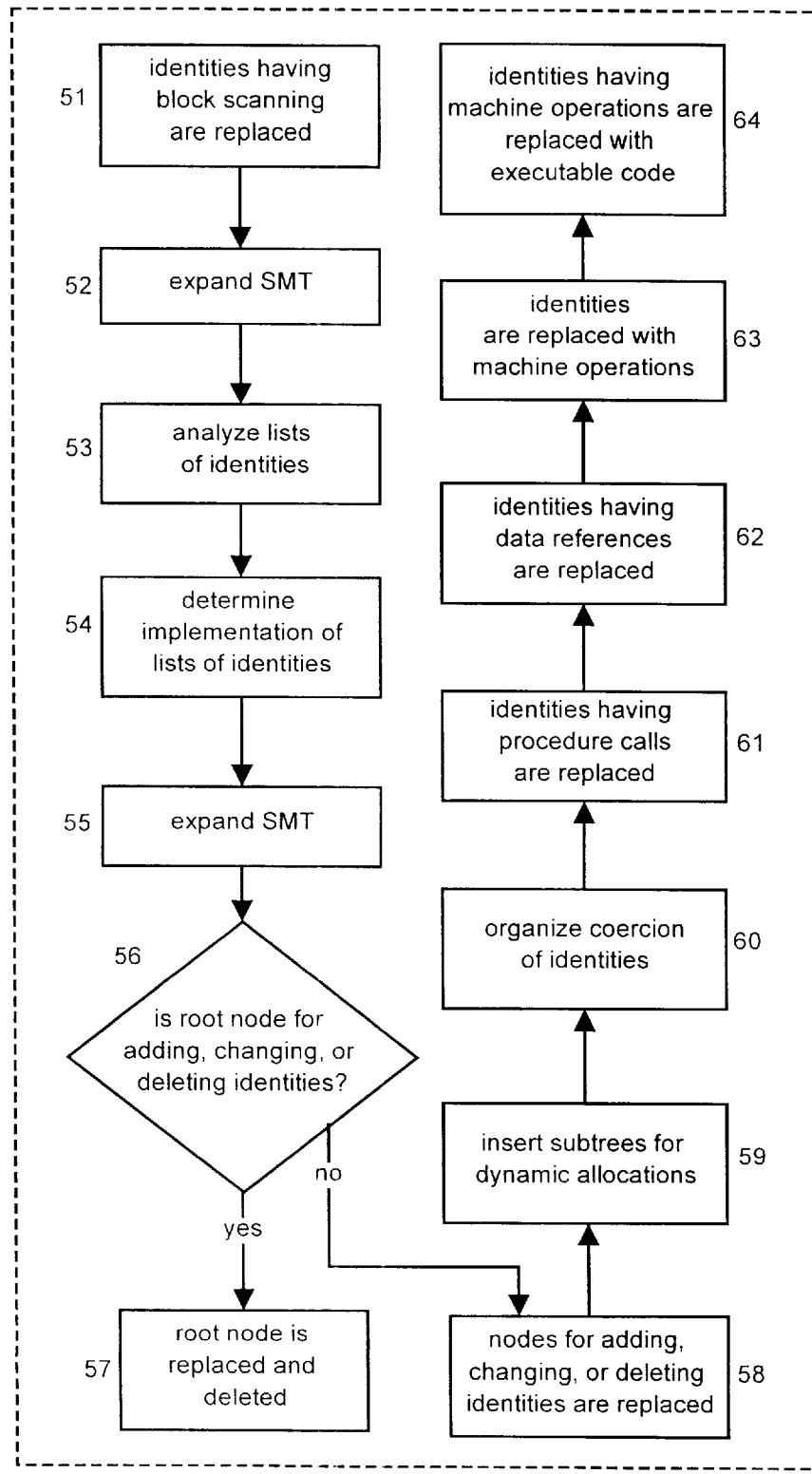
FIG. 12 is a function block diagram illustrating blocks 36 and 40 of FIG. 11.

In FIG. 12, these twelve stages are illustrated using a functional block diagram. For each of the twelve stages, the root node and each of the nodes of the SMT, and not an external parser, contain the instructions for self-manipulating. Each of the stages corresponds to a purpose for self-manipulating, and at each stage, only the nodes whose identities have self-manipulating instructions 115 for the purpose of that stage self-manipulate.

In block 51, identities having block scanning are replaced. Each block of sentences is preceded by a header sentence. The header sentence has an associated identity for block scanning, and the identity has instructions 115 for self-manipulating to recognize a block of sentences, to read the sentences of the block, and to cause the sentences to match and to block scan. The identity then replaces itself in the SMT with a null identity and places the block scanned subtrees of the block as child nodes of the created null identity.

As an example of block scanning, the sentence "If it's 5 pm, do as follows." is the header sentence to the following block of two sentences: "Pack up." and "Go home." The "do as follows" identity is the identity having block scanning. The final result of replacing the identity having the block scanning is a subtree having a root node pointing to the "if" identity. The root node also points to two children subtrees. The first child points to "its," and the second child points to a null identity. Further, the second child node of the root node has two children subtrees, which represent the "Pack up." and the "Go home." sentences of the block.

In block 52, each identity with instructions 115 for self-manipulating for the purpose of expansion expands the SMT by replacing itself and its subtrees with a subtree formed by combining a template subtree with its original subtrees. As an example, a node holding the identity "average" and having two child nodes holding the "x" and "y" identities might be replaced by a subtree headed by a node holding the identity "divide" and having two child nodes holding the "+" and "2" identities. The "+" node has two child nodes holding the "x" and "y" identities.

In block 53, lists of identities are analyzed. Some identities represent lists of identities or are concerned with lists of identities. Such identities in the SMT self-manipulate in block 53 with the general aim of deciding how to handle the list in question. In a preferred embodiment, such an identity replaces itself in the SMT with identities that will self-manipulate. As an example, a node having the identity "each" and a child node having the identity "month" might be replaced by a node pointing to the general purpose identity "range" and having three children nodes pointing to the identities "month," "january," and "december."

In block 54, the implementation of lists of identities is determined. The identities in the subtree that self-manipulates in block 54 replace themselves and their child subtrees with subtrees that express in general terms how the references to the lists of identities will be implemented. To continue the previous example, the subtree headed by the node pointing to "range" might be replaced by a subtree that would compile in a later stage to a loop that will execute 12 times.

In block 55, as in block 52, the SMT is expanded for those operations that need to be performed after the implementation of the lists of identities determined in block 54. As an example, the form of the replacement for a subtree headed by a node holding the identity "show" might be dependent on the kind of thing being shown. If the child node of the "show" identity points to a list, the nature of the list should be established before trying to decide how to show it.

In block 56, it is determined whether the purpose of the root node of the SMT is for adding, changing, or deleting identities. Additionally, in block 56, it can be determined whether the purpose of the SMT is to reset the current environment for self-manipulation. If the SMT has one of these purposes, flow proceeds to block 57. If the SMT does not have one of these purposes, flow proceeds to block 58.

As an example, for a source which is a declaration sentence in a procedure, the flow proceeds to block 57. As another example, for a source which is a sentence to be executed when the procedure is called, the flow proceeds to block 58.

As an example, if a root node has the identity "DefineNewIdentity" and has a child nodes having the name of the new identity and the desired properties of the new identity, the instructions 115 for self-manipulating of "DefineNewIdentity" creates the new identity and then deletes the SMT.

In block 58, nodes in the SMT which have an identity whose purpose is to add, change, or delete identities are identified and are self-manipulated. Additionally, these nodes whose purpose is to change the current environment can also be identified and self-manipulated.

Block 57 and 58 replace nodes with the same purpose and are executed similarly. The difference between block 57 and 58 is that in block 57 the node is the root node of the SMT and in block 58 the node is not the root node. After block 57, after performing its purpose, the SMT is deleted. After block 58, after performing its purpose, the identified node is deleted, but there still remains nodes in the SMT to self-manipulate.

In block 59, subtrees are added to the SMT for nodes with identities that allocate identities from a dynamic pool of identities. An example of such an identity is one that represents a string of text, for which text space is automatically generated as required. Subtrees are inserted into the SMT to ensure that the identity and the identity's text space allocations are automatically deleted after the text space allocations are no longer needed. In other words, in block 59, "housekeeping" subtrees are inserted into the SMT.

In block 60, the coercion of one type of identity to another is organized. As an example, consider a node pointing to the identity "+" and having two child nodes pointing to an integer identity and a floating-point number identity. The "+" identity is replaced by the "floating-point-add" identity, and a node having a conversion identity is inserted between the "floating-point-add" identity and the node having the integer identity.

In block 61, identities having procedure calls replace themselves with subtrees detailing the mechanics of the procedure call. As an example, an identity representing the action of printing a file would replace itself with a subtree containing three items: (1) a push to the stack before the call of the identity of the file, (2) the logical address of the printing procedure, and (3) a pop of the stack after the call.

In block 62, identities having data references replace themselves with subtrees detailing the kind of reference. As an example, a node with an identity having a data reference might be replaced by a node having the identity "scalar-data-reference" and child nodes that have, among other things, the location of the data item and the information that a 32-bit transfer is required.

In block 63, identities are replaced with operations for a generic stack-based machine. The identities have instructions 115 for self-manipulating to replace themselves with identities representing generic hardware operations. Examples of such generic hardware operations are "write a data item to the stack" and "pop the stack."

In block 64, the identities having machines operations generated in block 63 are replaced with executable code for a particular machine. These identities have instructions 115 for self-manipulating for producing the executable code. An example of executable code is a string of binary for operating the particular machine. The destination of the executable code depends on the particular machine concerned. In a preferred embodiment, the executable code is collected in memory or in a file to form an executable body of code. The SMT thereafter is deleted.

In a preferred embodiment, after block 64, if the SMT is part of an interactive dialog between the user and the computer, the executable code generated in block 64 is executed immediately and deleted. Alternatively, if the SMT is a procedure being created, the executable code is an identity to be pointed to by a node in another SMT. In this alternative, the executable code is not deleted, but is stored for later use by other SMTs.

In a preferred embodiment, blocks 51–62 are machine independent, block 63 is semi-machine dependent, and block 64 is machine dependent.

Examples of Activating Self-Manipulating Trees

Figure 13A:
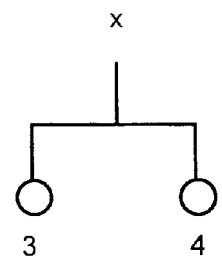
FIGS. 13A–13D illustrate activating exemplary self-manipulating trees.

In FIGS. 13A–13D, examples of activating a SMT are illustrated. In FIG. 13A, a SMT which replaced the source text "3+4" is shown. After activating the root node, the SMT self-manipulates into a single node with the pointer 103 for its data structure 100 pointing to the "7" identity.

Figure 13B:
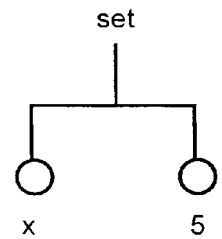

In FIG. 13B, the SMT for the text source of "set x to 5" is shown. After activating the root node, the SMT self-manipulates into a null after having first set the variable x to the value of 5.

Figure 13C:
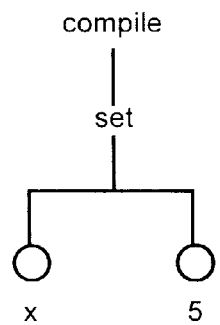

In FIG. 13C, the SMT for replacing the source text of "compile set x to 5" is illustrated. After activating the root node of this SMT, the SMT self-manipulates into a one node tree, which points to executable code for the instruction "set x to 5."

Figure 13D:
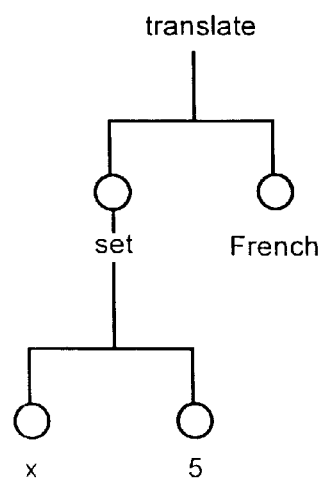

In FIG. 13D, the SMT replacing the source text of "translate set x to 5 to French" is illustrated. After activating the root node of this SMT, the SMT self-manipulates into a one node SMT. The pointer 103 of this single node points to the French for "set x to 5."

SECOND EMBODIMENT

In a second embodiment, the area in which identities are searched for use in open-ended inviting is modified. In the open-ended inviting in blocks 10 and 15 of FIG. 6 of the first embodiment, it was assumed that all identities were available for inviting. In the second embodiment, this assumption is modified. In particular, the identities are divided into regions.

Figure 14:
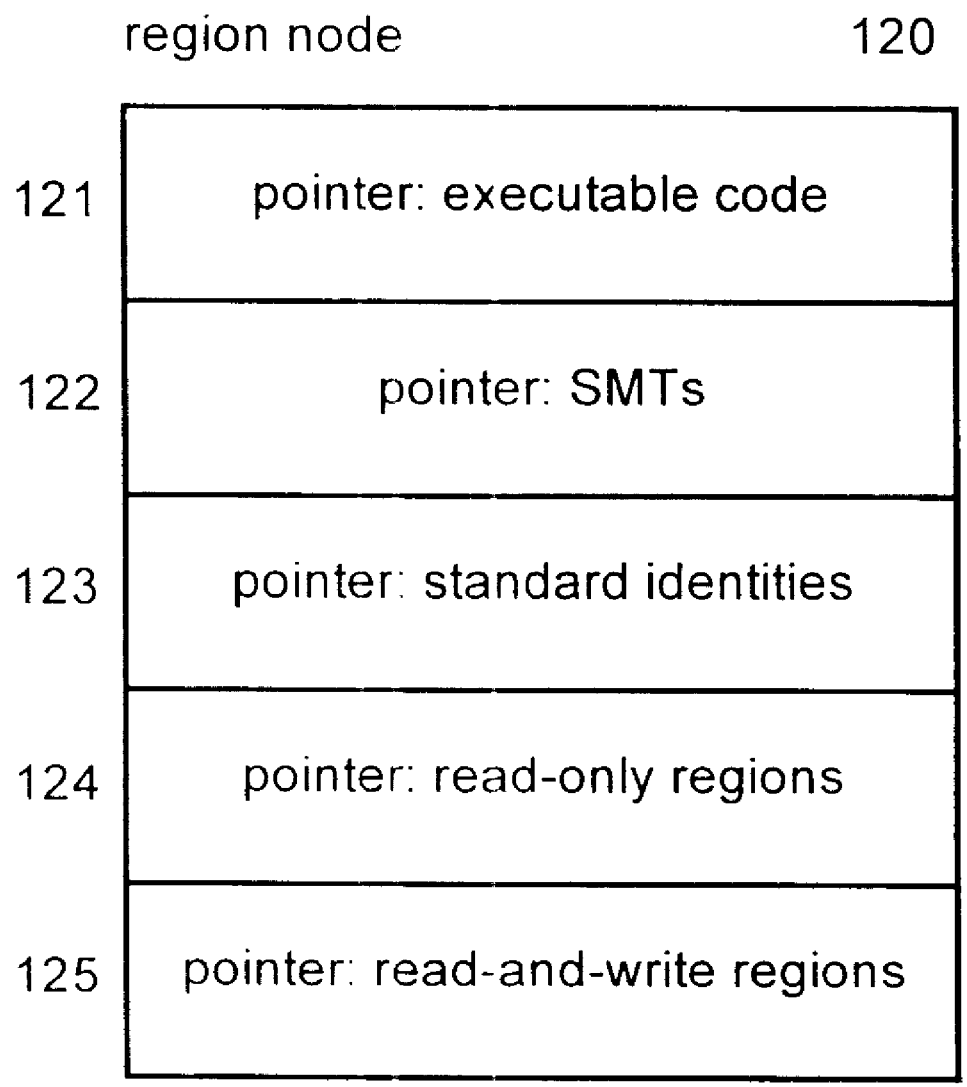
FIG. 14 illustrates the data structure for a region node according to the second embodiment of the invention.

Each region is assigned a region node and has a corresponding data structure, which is illustrated in FIG. 14. In FIG. 14, the data structure 120 for the region node has five types of pointers. Pointers 121 point to executable code for the region. Pointers 122 point to the SMTs for the region. Pointers 123 point to the standard identities of the region. Pointers 124 point to read-only regions accessible by the region. Pointers 125 point to read-and-write regions accessible by the region.

In a preferred embodiment, when a source is input, the source is initially associated with a region, which has a data structure 120 such as that illustrated in FIG. 14. For the open-ended inviting of identities in blocks 10 and 15 of FIG. 6, the identities pointed to by pointers 121–123 are first initially invited. If none of these identities match the source, other regions can be searched for identities to match to the source. This is illustrated in FIG. 15.

Figure 15:
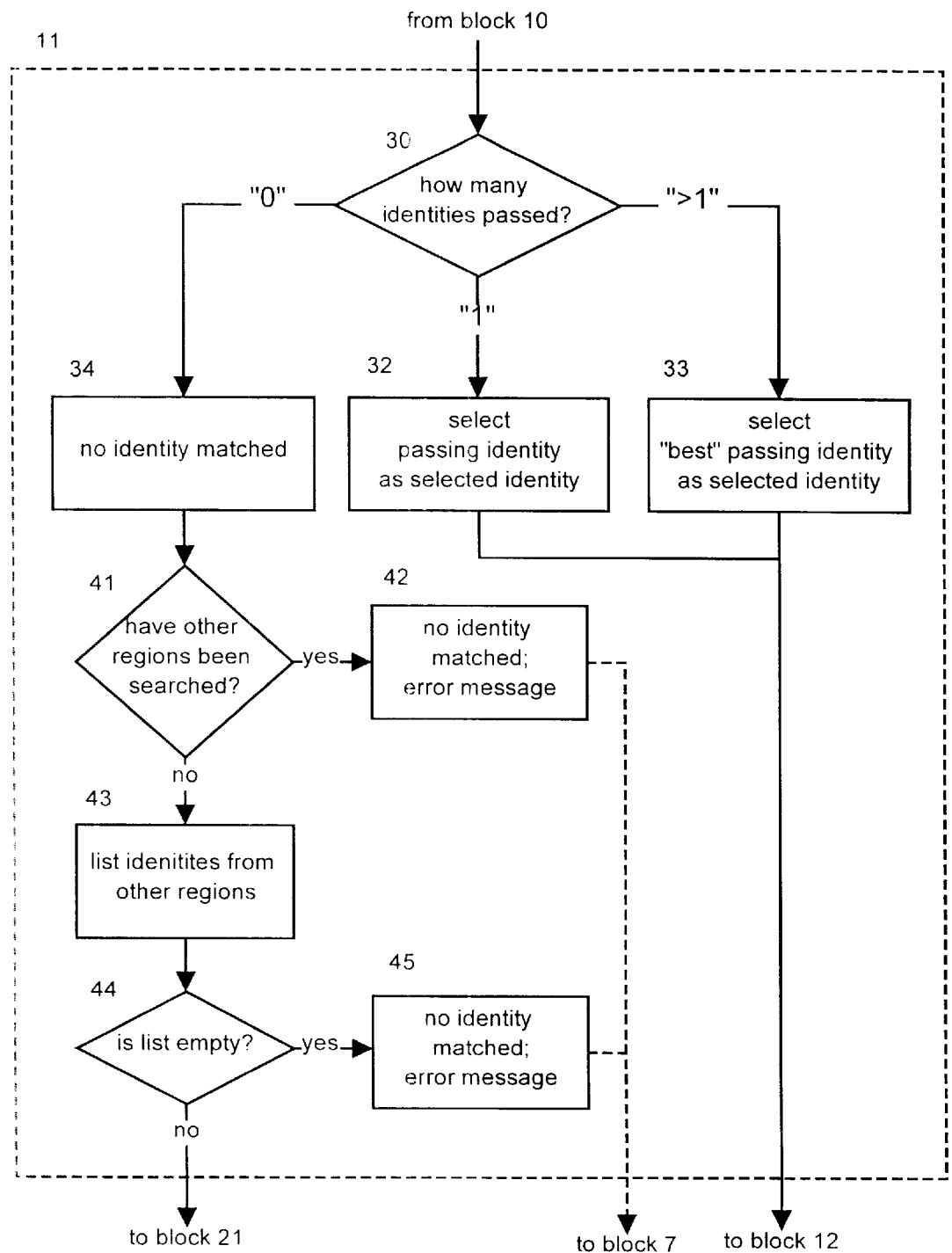
FIG. 15 is a function block diagram illustrating block 11 of FIG. 6 according to the second embodiment.

FIG. 15 is similar to FIG. 8 but is modified to incorporate accessing of identities in different regions. In particular, if no identities were matched from the identities available from pointers 121–123, the flow proceeds from block 30 to block 34 in FIG. 15.

In block 41, after no identities were matched in block 34, it is determined whether other regions have been searched yet. These other regions are those indicated by pointers 124 and 125 in the data structure 120 for the region. If these other regions have already been searched, the flow proceeds to block 42. If these regions have not yet been searched, the flow proceeds to block 43.

In block 42, no identity from the identities pointed to by pointers 121–123 and from the identities in the other regions pointed to by pointers 124–125 can be matched to the source. An error message is reported to the user of the computer. The functionality of block 42 is similar to that of block 31 of FIG. 8.

In block 43, after it is determined that the other regions have not yet been searched, identities from the other regions pointed to by pointers 124–125 are listed in an identities list. This listing is similar to the listing of identities in block 20 of FIG. 7. In other words, the identities in the other regions pointed to by pointers 124–125 are open-ended invited in a manner similar to that discussed above for block 20 in FIG. 7.

In block 44, it is determined whether the identities list determined in block 43 is empty. If the identities list is not empty, the flow proceeds to block 21 of FIG. 7. If the identities list is empty, the flow proceeds to block 45.

In block 45, no identities were found in the other regions pointed to by pointer 124–125, and an error message is reported to the user of the computer. The functionality of block 45 is similar to that of block 31 in FIG. 8.

In a preferred embodiment, the open-ended inviting of identities ceases either when a match is found as in blocks 32 or 33 or when no match is found because the identities in the regions pointed to by pointers 124–125 have either no identities to match as in block 42 or no identities to invite as in block 45. Alternatively, instead of ceasing when no match is found, the open-ended inviting can continue by recursively inviting identities from the regions pointed to by pointers 124–125 of the regions pointed to by pointers 124–125 of the initial region. In this alternative embodiment, if an identity is not matched, the recursion ceases after all accessible regions have been searched or after a pre-determined number of recursions.

As an alternative to FIG. 15, the regions pointed to by pointers 124 and 125 can be included in the open-ended inviting in block 10 of FIG. 6. For this alternative, block 11 in FIG. 8 of the first embodiment can be used for block 11 of the second embodiment.

In a preferred embodiment, pointers 124 and 125 are fixed. Alternatively, pointers 124 and 125 can vary. As an example, if a new region is identified by the user, a pointer to the newly identified region can be added to the pointers 124 or 125. Further, if a region is no longer desired, the pointer can be deleted from the pointers 124 or 125.

In a preferred embodiment, regions pointed to by pointers 124 can only be read and can not be altered, and regions pointed to by pointers 125 can be read and altered. In a preferred embodiment, the determination as to whether a region is "read-only" or "read-and-write" is user specific. As an example, a region can be read-only for one user and read-and-write for another user. Further, a region can be read-only for a user at one time and can be read-and-write for the same user at a different time.

In a preferred embodiment, a user is associated with an initial region. Alternatively, a user can be associated with a plurality of regions. Additionally, a user can move from one region to another. In a preferred embodiment, whatever the user does affects only the region with which the user is currently associated. Alternatively, the user can modify other regions in addition to or instead of modifying the user's current region.

In a preferred embodiment, the regions are implemented with a single general purpose computer. Alternatively, the regions can be implemented with multiple general purpose computers connected over a network. Each general purpose computer in the network is responsible for maintaining a single region or multiple regions. In a preferred embodiment, each region is wholly contained by a single general purpose computer, which may maintain one or more regions. A user who is "in" one of these regions and has read-and-write access to the region can alter the region. The user does not need to directly access the region's computer when the user is "in" the region. Alternatively, a region can be maintained by a plurality of general purpose computers.

In a preferred embodiment, each region develops the region's own set of identities. When one region passes an identity to another region, the another region is able to use the identity passed. In other words, if the identity passed is executable code, the another region is able to execute the executable code. If the identity passed is a SMT, the another region will be able to access all of the identities pointed to by the pointers 103 of the data structures 100 of the nodes in the passed SMT. If the identity passed is a standard identity, the another region is able to implement the instructions and external constraints of the data structure 110 of the passed standard identity.

In a preferred embodiment, to enable the another region receiving the passed identity to use the passed identity, only "universal" identities are passed.

Figure 16:
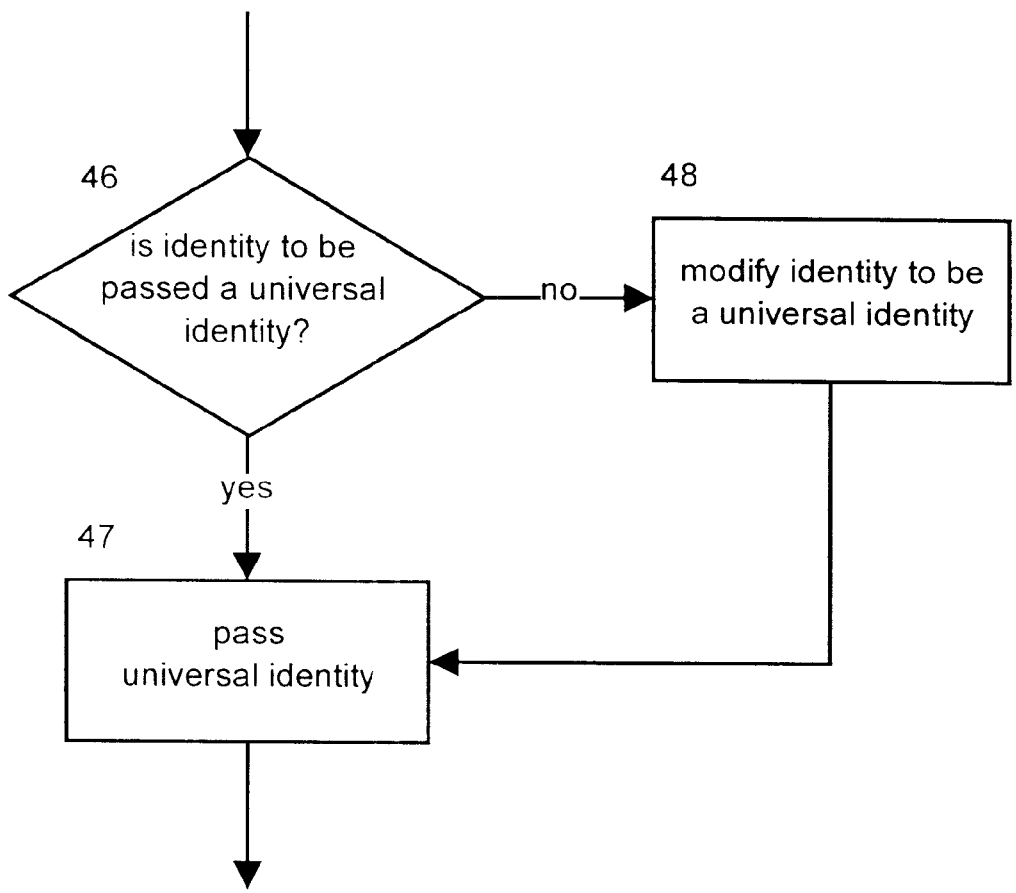
FIG. 16 is a function block diagram illustrating the passing of universal identities according to the second embodiment.

In FIG. 16, a functional block diagram illustrates passing only universal identities. In block 46, it is determined whether the identity to be passed is a universal identity. If it is a universal identity, the flow proceeds to block 47. If it is not a universal identity, the flow proceeds to block 48.

In block 47, the identity to be passed is a universal identity, and this identity is passed to the another region.

In block 48, the identity to be passed is not a universal identity, and the identity is modified to be a universal identity. In a preferred embodiment, this modification occurs by "rolling back" the identity to be passed to a universal identity. In other words, either a definition of the identity is passed that is expressed in terms of universal identities, or the SMT containing the node that points to it is replaced by an equivalent SMT that only points to universal identities.

As an example, instead of sending executable code, the region node can send the SMT equivalent of the executable code to the another region. After receiving the equivalent SMT, the another region can self-manipulate the equivalent SMT to obtain code executable by the computer maintaining the another region.

As an alternative to having universal identities, varying grades of universality can be used. For this alternative, when the identity is translated in block 48, the identity only needs to be translated to a level understandable by the another region receiving the identity.

As an example, to send a SMT or a standard identity, the sending region and the receiving region need to determine what identities are common to both. Once this is established, the sending region translates the SMT or standard identity to the common identities and transfers the translated SMT or standard identity to the receiving region. The common identities can be universal identities or identities more complex than the universal identities.

In a preferred embodiment, the passing of identities is supervised by a central computer or by a hierarchy of regional computers. Alternatively, each region node can have a subtree for monitoring the passing of identities to other region nodes.

THIRD EMBODIMENT

In a third embodiment, the source is a request for information from a network.

In a preferred embodiment, the source, which is input as in block 7 of FIG. 5, is a natural language request. As discussed above for block 7, this request can be input into the computer in a variety of manners. The request, however, may be in a natural language, such as English, French, or German, and may be a request for information. As an example, one natural language request source could be "What is the population of the capital of Missouri?"

Once input, the source is matched to identities to obtain a SMT as in block 8 of FIG. 5. For the above example, the following identities could be invited in block 10 of FIG. 6: "What is X," "population of a city," "capital of a state," and "Missouri."

Each of the invited identities could have instructions 115 for self-manipulating. For example, the identity "Missouri" has no instructions 115. The identity "capital of a state" has instructions 115 for self-manipulating the subtree pointing to the identity into a subtree pointing to a representation for the capital of the desired state. The identity "population of a city" has instructions 115 for self-manipulating the subtree pointing to the identity into a subtree pointing to a representation for the population of the desired city. The identity "What is X" has instructions 115 for self-manipulating to display the X, whether X is text or a numerical value. The node for the "What is an X" identity has a child node, which points to X.

Once the source is matched to a SMT, the purpose in activating the SMT is to respond to the request for information. In activating the SMT, identities can be invited from a single region or from multiple regions as discussed in the second embodiment.

In order to respond to the request for information, the standard identities need to contain such information. In a preferred embodiment, this information is contained in the representation 111 of internal knowledge of the data structure 110 for the standard identity. For example, for the source of "What is the population of the capital of Missouri?," the four standard identities discussed above could be used.

In order to respond to a request for information, the portions of the source which do the requesting need to be matched to standard identities. In a preferred embodiment, these portions of the source are identified in the source identifiers 116 of the data structures 110 of the standard identities. For example, for the source "What is the population of the capital of Missouri?," the source identifier 116 for the "What is X" identity is "What is." The source identifier 116 for the "population of a city" identity is "the population of." The source identifier 116 for the "capital of a city" identity is "the capital of." The source identifier 116 for the "Missouri" identity is "Missouri."

If the third embodiment is implemented using the Internet as the network, an Internet site is created for accessing by an Internet user. In a preferred embodiment, the Internet site has many regions, and each region has an associated region node with a data structure 120.

To request information, an Internet user inputs a natural language information request source to the Internet site. The Internet site matches the source to a SMT as in block 8 of FIG. 5 and activates the SMT as in block 9 of FIG. 5 to respond to the information request of the Internet user.

In a preferred embodiment using the Internet, regions are created for different types of information. For example, one region can be created for information corresponding to geography, and another region can be created for information corresponding to automobiles. To respond to the request of "What is the population of the capital of Missouri?," the region containing information on geography would need to be accessed.

As another example, to respond to the request "What is the model number for wiper blades on a 1990 Nissan Sentra?, " the region containing information on automobiles would need to be accessed. As a further example, for the request "What is the phone number and address of the XYZ Corporation?," a region containing addresses and phone numbers of companies or a region for the XYZ Corporation would need to be accessed for identities containing this information.

In a preferred embodiment, some of the regions of the Internet site are private regions belonging to individual users, and some of the regions are public regions maintained by the owner of the Internet site.

In a preferred embodiment, the Internet site interfaces directly with the Internet using SMTs. In this case, the user can use the Internet site to augment the identities on the user's own general purpose computer using the identities of the Internet site. Alternatively, a user has a non-SMT user interface (e.g., a web browser) that sends information requests to the Internet site for matching and activating.

In a preferred embodiment, the Internet site interfaces directly with the Internet using SMTs. Alternatively, the Internet site interfaces with the Internet using a standard server.

In a preferred embodiment, an Internet site employing the present invention is augmented with conventional servers and a web browser to increase the functionality of the Internet site.

In a preferred embodiment, the Internet site can have identities for sending software commands in another computer language (e.g., JAVA) to other Internet sites. These identities self-manipulate an SMT into a command of a desired computer language.

As the invention has been described in detail with respect to the preferred embodiments, it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A method for operating a general purpose computer comprising:
   inputting a source;
   matching identities to the source using open-ended inviting to obtain a self-manipulating tree, wherein instructions for obtaining the self-manipulating tree are contained within the identities; and
   self-activating the self-manipulating tree to operate the computer.

2. A method according to claim 1, wherein the self-manipulating tree comprises a plurality of nodes connected hierarchically, and wherein each node comprises information for navigating through the self-manipulating tree.

3. A method according to claim 1, wherein the self-manipulating tree comprises a plurality of nodes connected hierarchically, and wherein each node comprises:
   information for identifying relationships between nodes in the self-manipulating tree; and
   information for identifying an identity.

4. A method according to claim 1, wherein the self-manipulating tree comprises a plurality of nodes connected hierarchically, and wherein each node comprise:
   first information for identifying a sibling node to the right of the node;
   second information for identifying a leftmost child node of the node; and
   third information for identifying an identity.

5. A method according to claim 1, wherein the identities comprise at least one of an executable code, another self-manipulating tree, and a standard identity.

6. A method according to claim 1, wherein the identities comprise at least one standard identity.

7. A method according to claim 5, wherein the at least one standard identity comprises at least one of a representation of internal knowledge of the computer, instructions for replacing the source, external constraints for generating nodes in the self-manipulating tree, instructions for evaluating identities for open-ended inviting, instructions for self-manipulating, and a source identifier.

8. A method according to claim 1, wherein matching comprises:
   open-ended inviting a plurality of identities for matching to a root node of the self-manipulating tree;
   selecting an identity from the plurality of identities for the root node of the self-manipulating tree; and
   modifying the self-manipulating tree with the selected identity.

9. A method according to claim 1, wherein the self-manipulating tree comprises at least one node, and wherein matching comprises:
   selecting a node of the self-manipulating tree;
   open-ended inviting a plurality of identities for matching to the selected node of the self-manipulating tree;
   selecting an identity from the plurality of identities for the selected node of the self-manipulating tree; and
   modifying the self-manipulating tree with the selected identity.

10. A method according to claim 1, wherein matching comprises:
    forming an identities list having a plurality of identities;
    selecting an identity from the identities list;
    experimenting with the selected identity to determine whether the selected identity matches the source; and
    indicating whether the selected identity matches the source.

11. A method according to claim 1, wherein the self-manipulating tree comprises a root node and an identity associated with the root node, and wherein activating comprises:
    activating the root node of the self-manipulating tree; and
    actuating the self-manipulating tree according to the identity associated with the root node, wherein instructions for actuating are contained within the self-manipulating tree.

12. A method according to claim 1, wherein matching comprises:
    forming an identities list from identities associated with a plurality of regions.

13. A method according to claim 1, wherein matching comprises:
    selecting identities from a plurality of regions.

14. A method according to claim 1, further comprising:
    operating the general purpose computer to access information using a network.

15. A method according to claim 1, wherein said step of inputting a source comprises the step of:

accepting as an input a command instructing the computer to perform a task, wherein said command is subsequently converted to a self-manipulating tree.

16. A method according to claim 1, wherein said step of inputting a source comprises the step of:

accepting as an input a natural language request, wherein said natural language request is subsequently converted to a self-manipulating tree.

17. A computer architecture comprising:

a general purpose computer; and a computer-readable medium containing executable code implementing the method according to claim 1.

18. A computer architecture according to claim 17, wherein each self-manipulating tree comprises a plurality of nodes being connected hierarchically, and wherein each node comprises:

information for determining relationships between nodes in the self-manipulating tree; and information for identifying one of an executable code, a self-manipulating tree, and a standard identity.

19. A computer architecture according to claim 17, wherein each standard identity comprises at least one of a representation of internal knowledge of the computer, instructions for replacing a source, external constraints for generating nodes in a self-manipulating tree, instructions for evaluating identities for open-ended inviting, instructions for self-manipulating, and a source identifier.

20. A computer architecture according to claim 17, wherein the computer is parser-free.

21. A computer architecture according to claim 17, wherein said computer-readable medium further contains:

at least one self-manipulating tree; and a plurality of standard identities.

22. A computer-readable medium comprising executable code implementing the method according to claim 1.

23. A computer-readable medium according to claim 22, wherein the self-manipulating tree comprises a plurality of nodes being connected hierarchically; and wherein each node comprises:

information for determining relationships between nodes in the self-manipulating tree; and information for identifying one of an executable code, another self-manipulating tree, and a standard identity from the plurality of standard identities.

24. A computer-readable medium according to claim 22, wherein each standard identity comprises:

a representation of knowledge;

instructions for replacing a source;

external constraints for generating nodes in a self-manipulating tree;

instructions for evaluating identities for open-ended inviting;

instructions for self-manipulating; and a source identifier.

25. A computer-readable medium according to claim 22, further comprising:

at least one self-manipulating tree; and a plurality of standard identities.

26. An apparatus for accessing information from a network comprising:

a general purpose computer connected to the network and having an input for receiving a source; and a computer-readable medium comprising a self-manipulating tree matched to the source, the self-manipulating tree being matched to identities using open-ended inviting, the self-manipulating tree being self- activated to access information from the network.

27. An apparatus according to claim 26, wherein the network is the Internet.

28. A computer-readable medium comprising code segments for accessing information requested by a source input to a general purpose computer connected to a network, the code segments comprising:

a self-manipulating tree matched to the source, the self-manipulating tree being matched to identities using open-ended inviting, the self-manipulating tree being self-activated to access information from the network.

* * * * *